United States Patent [19]

Reuter et al.

[11] Patent Number: 4,506,159

[45] Date of Patent: Mar. 19, 1985

[54] DOSIMETER CHARGING APPARATUS

[75] Inventors: Frederick A. Reuter; Charles J. Moorman, both of Cincinnati, Ohio

[73] Assignee: Dosimeter Corporation of America, Cincinnati, Ohio

[21] Appl. No.: 522,038

[22] Filed: Aug. 10, 1983

[51] Int. Cl.³ .............................................. G01T 1/18
[52] U.S. Cl. ................................................. 250/377
[58] Field of Search ........................ 250/374, 376, 377

[56] References Cited

U.S. PATENT DOCUMENTS

| 2,765,413 | 10/1956 | Andrews | 250/377 |
| 3,193,749 | 7/1965 | Grimm et al. | 250/377 |
| 4,224,522 | 9/1980 | Jackson et al. | 250/377 |

*Primary Examiner*—Janice A. Howell
*Attorney, Agent, or Firm*—Wood, Herron & Evans

[57] ABSTRACT

An apparatus for charging a dosimeter which has a capacitor connected between first and second electrodes and a movable electrode in a chamber electrically connected to the first electrode. The movable electrode deflects varying amounts depending upon the charge present on said capacitor. The charger apparatus includes first and second charger electrodes couplable to the first and second dosimeter electrodes. To charge the dosimeter, it is urged downwardly into a charging socket on the charger apparatus. The second dosimeter electrode, which is the dosimeter housing, is electrically coupled to the second charger electrode through a conductive ring which is urged upwardly by a spring. As the dosimeter is urged into the socket, the ring moves downwardly, in contact with the second charger electrode. As the dosimeter is further urged downwardly, the first dosimeter electrode and first charger electrode contact one another, and an insulator post carrying the first and second charger electrodes is urged downwardly. Downward movement of the post effects the application of a charging potential between the first and second charger electrodes. After the charging potential has been applied, the dosimeter is moved further into the charging socket against the force of a relatively heavy biasing spring until the dosimeter reaches a mechanical stop in the charging socket.

11 Claims, 2 Drawing Figures

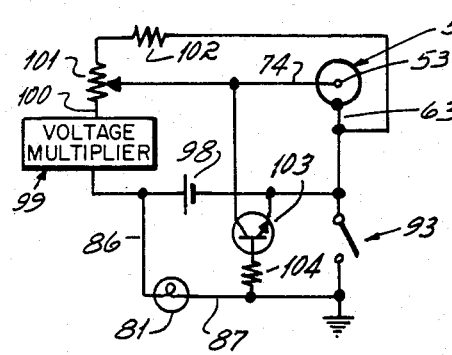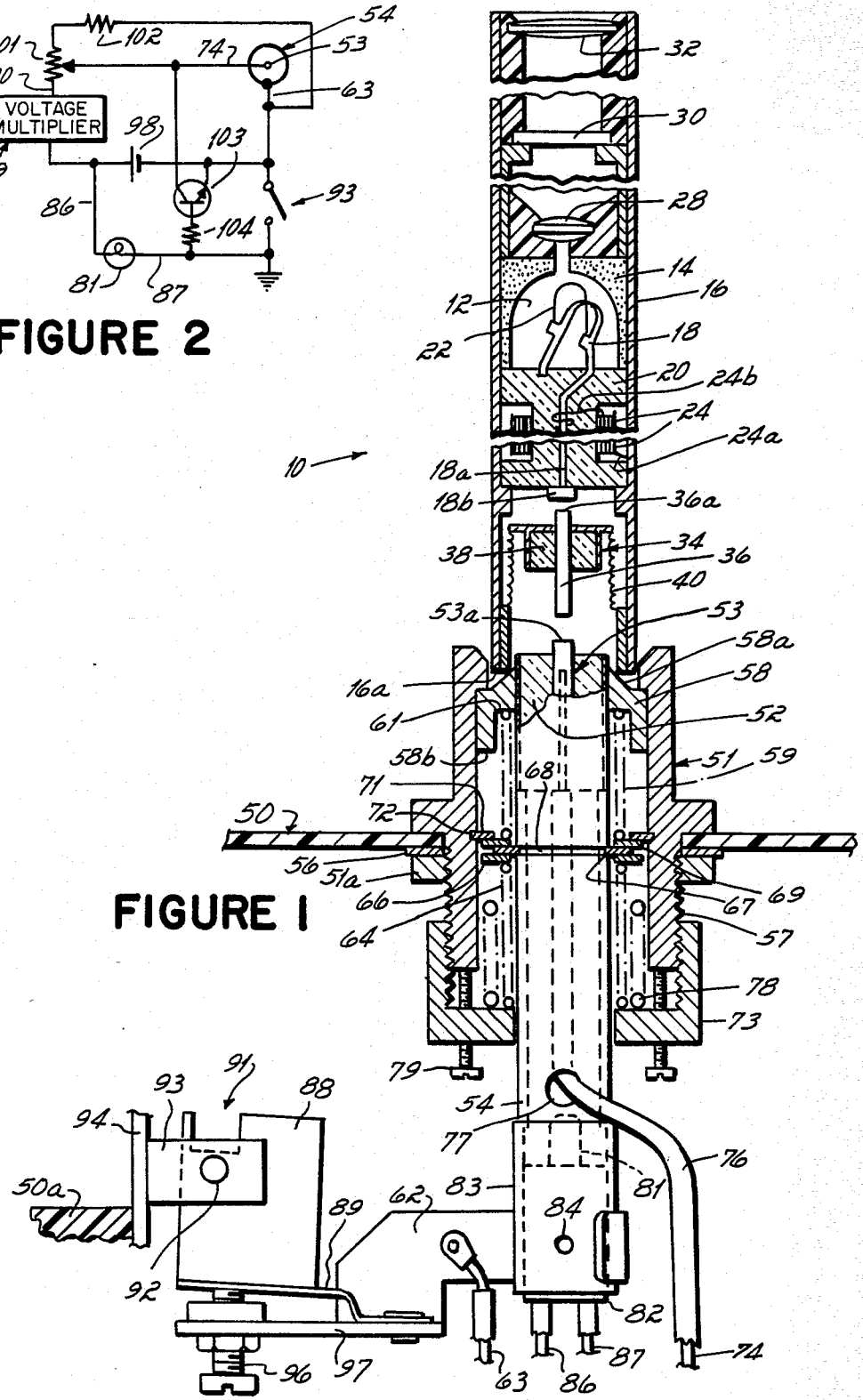

DOSIMETER CHARGING APPARATUS

DESCRIPTION OF THE INVENTION

This invention relates generally to a dosimeter charger apparatus and more particularly concerns such an apparatus wherein there is improved electrical and mechanical coupling between a dosimeter and the charger apparatus in a charging operation.

A dosimeter charging apparatus, for a dosimeter of the type with which the present charger apparatus is advantageously employed, is described in U.S. Pat. No. 4,224,522, to Jackson et al, which patent is incorporated herein by reference.

Briefly, dosimeters of the type with which the present charger apparatus is designed to operate typically include an ionization chamber defined by an outer gas-tight electrically conductive casing which is transparent to the radiation to be monitored and an inner electrode positioned within the outer electrode. A capacitor connected between the inner and outer electrodes establishes an electrostatic potential in the ion chamber between the electrodes. Radiation penetrating the ionization chamber through the outer electrode ionizes the gas within the chamber, causing charge to flow between the inner and outer electrodes and the initially charged capacitor to discharge. The amount of capacitor discharge occurring during a given radiation measuring interval, or cycle, is proportional to the amount of ionizing radiation penetrating the chamber during that interval or cycle. An indication of the change in capacitor charge, and hence the amount of radiation, in a measuring interval can be obtained by monitoring the movement of a flexible electrometer electrode located within the chamber which is connected to the inner electrode. The flexible electrometer electrode moves toward the fixed-position inner electrode in a given measuring interval an amount proportional to the reduction in charge of the capacitor, and hence the amount of incident radiation, which occurred during the measurement interval.

To initialize or zero the dosimeter at the commencement of a measuring interval, the dosimeter capacitor is charged from an external high voltage dc power supply. The charge applied to the dosimeter capacitor moves the flexible electrometer electrode away from the inner electrode to some arbitrary position correlated to "zero". Thereafter, as radiation penetrates the ionization chamber to discharge the dosimeter capacitor, the flexible electrometer electrode moves toward the fixed electrode in proportion to the quantity of incident radiation. At any given time, the position of the flexible electrometer electrode can be observed, and its relative movement from the "zero" position determined, to ascertain the amount of radiation which has occurred since the "zeroing" operation.

To facilitate charging the dosimeter capacitor, it has been the practice to provide the dosimeter with an outer electrically conductive tubular protective housing which is in electrical contact with the outer electrode of the ionization chamber, and a movable contact within the tubular housing which can be shifted axially between a charging position in contact with the inner electrode of the ionization chamber and a non-charging position displaced therefrom. When it is desired to charge the dosimeter capacitor, positive and negative high voltage terminals, or charging electrodes, outputs from the dosimeter charging apparatus, are brought into contact with the movable contact and outer conductive housing of the dosimeter. While so engaged, the dosimeter housing is moved axially relative to the charger electrodes such that the movable contact of the dosimeter is urged axially into contact with the inner electrode of the ionization chamber to complete a charging path between the dosimeter capacitor and the charging electrodes of the charger. Commencement of the capacitor charging operation begins once this charging path is complete.

As set forth in detail in the above-mentioned Jackson et al patent, the movable contact in the dosimeter is utilized in order to provide a moisture-free enclosure for the exterior surface of the ion chamber. In order to do this, the movable electrode extends axially through an insulator disk which is mounted to the outer cylindrical conductor by a flexible moisture-impervious bellows. The provision of a movable dosimeter contact of this type in turn leads to a stray capacitance between the movable dosimeter contact and the dosimeter housing. It is therefore important that a dosimeter charger apparatus includes means for discharging this stray capacitance before the beginning of a radiation monitoring interval or cycle, after charging the principal dosimeter capacitor. If this stray capacitance is not discharged after charging the principal dosimeter capacitor, its gradual leakage during a radiation measuring interval or cycle will result in an erroneous positioning of the flexible electrometer electrode, and hence an erroneous radiation reading.

The dosimeter charging apparatus described in the Jackson et al patent includes a spring-biased, axially-shiftable non-conductive post which has mounted on it in spaced apart relation the positive and negative charging electrodes. The post is designed to fit within the open end of a tubular dosimeter housing below the movable dosimeter contact when a dosimeter is to be charged. Underlying the shiftable post is a switch responsive to movement of the post from a normal extended position to a retracted dosimeter-charging position. When the tubular dosimeter housing is engaged with the post such that the movable dosimeter contact and housing make electrical contact with the positive and negative charging electrodes, and the dosimeter initially moved relative to the charger, the post is urged to its retracted position by the movable dosimeter contact and the underlying switch is activated to energize the high voltage dc power supply and to place a solid state switch in a non-conductive condition to remove a short circuit from across the charging electrodes. When the dosimeter housing is advanced further, the additional movement of the dosimeter housing relative to the charger causes the movable dosimeter contact to be moved relative to the dosimeter housing by the post into engagement with the inner electrode of the dosimeter completing a charging circuit from the high voltage dc charger supply electrodes to the dosimeter capacitor.

For this prior dosimeter charger, at the conclusion of the dosimeter capacitor charging operation, the dosimeter housing is moved away from the charger. Initial movement of the dosimeter housing relative to the charger causes the movable dosimeter contact to move relative to the dosimeter housing, out of engagement with the inner electrode of the dosimeter, interrupting the circuit path between the dosimeter capacitor and the positive and negative charging electrodes of the charger. At this point, however, the movable contact and housing of the dosimeter are still in electrical contact with the positive and negative charging electrodes of the charger and the high voltage dc charging supply is still energized. As the dosimeter housing is now moved further away from the charger, the movable contact and housing of the dosimeter remain in electrical contact with the positive and negative electrodes of the charger, but the post moves away from its retracted position, deactuating the underlying switch. Deactuation of the switch results in deenergization of the high voltage dc power supply and, more significantly, places the solid state switch in its conductive condition which, in turn, places a short circuit across the positive and negative terminals of the charger. This is effective, since the charger electrodes are still in contact with the dosimeter movable contact and the dosimeter housing, to discharge the stray capacitance therebetween. Further movement of the dosimeter housing away from the charger results in disengagement of the positive and negative charger electrodes from the dosimeter movable contact and housing.

In the dosimeter charger disclosed in the Jackson et al patent, the negative charging electrode is mounted on the non-conductive shiftable post in the form of a U-shaped conductive wire spring seated in a suitably configured groove formed in the exterior surface of the post. The biasing spring for the post takes the form of a leaf spring lying beneath the post. When a dosimeter is moved into the charger housing, this leaf spring is urged downwardly by the post into electrical contact with an underlying electrical terminal mounted on a circuit board disposed beneath the movable post. The establishment of this contact is the switch actuation serving to energize the high voltage dc power supply for charging the dosimeter.

In the prior dosimeter charger apparatus, movement of the dosimeter into engagement with the charger is limited by a mechanical stop in the charger housing which is engaged by the outer tubular housing of the dosimeter. When the dosimeter is moved to this stop, depending upon the spacing between the first dosimeter electrode and the bottom of the dosimeter tube and the axial length of the movable contact in the dosimeter, a mechanical axial force of a greater or lesser amount is produced between the circuit board contact beneath the movable charger post and the first electrode of the dosimeter. If such force is excessive, damage can be done to the dosimeter contacts, or perhaps to the circuit board.

It has been an objective of this invention, therefore, to provide an improved dosimeter charger apparatus in which the mechanical force exerted between the charger apparatus and the dosimeter electrodes may be limited to an acceptable amount.

It is a related object of the invention to provide such an improved charger apparatus in which the mechanical force between the charger and the inner dosimeter electrode is adjustable.

Accordingly, the present invention is disclosed with regard to the provision of a relatively heavy biasing spring coupled between the movable charger post and a surface fixed relative to the charger platform which is compressed as the dosimeter is moved toward the charger apparatus to a point at which a mechanical stop is engaged. In the illustrated form of the invention, the surface fixed relative to the charger platform is adjustable to preset the maximum force which may be applied to the central contact of the dosimeter before the mechanical stop is reached.

Other objects and advantages of the invention, and the manner of their implementation, will become apparent upon reading the following detailed description and upon reference to the drawings, in which:

FIG. 1 is a vertical elevational view in cross section of a portion of the dosimeter charger of the invention with its charging post in initial contact with the charging end of a dosimeter; and FIG. 2 is a simplified schematic diagram of a circuit for use in the charger of FIG. 1.

While the invention is susceptible to various modifications and alternative forms, a specific embodiment thereof has been shown by way of the example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention, as defined by the appended claims.

In order to facilitate a complete understanding of the invention, a dosimeter of the type with which the present invention finds particular utility shall be described briefly herein. A more detailed description of the dosimeter may be found in the above-identified Jackson et al U.S. Pat. No. 4,224,522.

With reference to FIG. 1, a dosimeter 10 includes an ionization chamber 12 defined by an outer electrically conductive enclosure 14, which is in electrical contact with an electrically conductive cylindrical protective housing or case 16. Disposed within the ionization chamber 12 is a stationary, rigid, U-shaped electrically conductive metal frame 18, which is mounted in a generally vertical or axial disposition to an insulative bobbin 20 which seals the lower end of the conductive enclosure 14 defining the ionization chamber 12. Mounted on the frame 18 is a flexible quartz fiber electrode 22, which is also U-shaped. A capacitor 24 surrounds the central portion of the bobbin 20. The capacitor 24 has one terminal thereof electrically connected to the housing 16 and enclosure 14 via a lead 24a. The other capacitor terminal is connected to the frame 18 and quartz fiber 22 via lead 24b and a downwardly directed extension 18a of the frame 18 which passes centrally through the bobbin 20.

When the capacitor 24 is electrically charged, an electrostatic potential is applied between the conductive enclosure 14 surrounding the ionization chamber 12 and the combination frame 18 and quartz fiber 22. When ionizing radiation impinges on the ionization chamber 12, the gas within the chamber 12 ionizes. Ionization of the gas in the ionization chamber 12 causes charge to flow between (a) the enclosure 14 which is connected to one plate of the capacitor via the housing 16 and capacitor lead 24a and (b) the frame 18/quartz fiber 22 which is connected to the other plate of the capacitor via lead 24b and frame extension 18a. This charge flow discharges the capacitor 24. Since the quartz fiber 22 and the frame 18 are both connected to the same plate of the capacitor 24, both the quartz fiber and the frame are charged with like polarity, producing electrostatic repulsion forces between them. The greater (or lesser) the charge on the capacitor, the greater (or lesser) will be the electrostatic repulsion which exists between the quartz fiber 22 and the frame 18. Since the quartz fiber 22 is flexible and free to move relative to the stationary rigid frame 18, as the charge on the capacitor 24 varies, the physical separation between the quartz fiber 22 and the frame 18 also varies, with the variation in spacing being in direct proportion to the variation and capacitor charge. As a consequence, the degree of physical separation between the movable quartz fiber 22 and the rigid frame 18 is a measure of the charge on the capacitor 24. The dosimeter is therefore charged to place the electrode 22 at an initial, or "zero", position, and the subsequent displacement of the electrode 22 from this "zero" position is a measure of the amount of radiation incident on the chamber 12 since the capacitor 24 was charged.

The position of the quartz fiber electrode 22 is observed by projecting the position of the quartz fiber through an objective lens 28 onto a calibrated reticle 30, which is then viewed through a microscope eyepiece 32. To facilitate projection of the position of the quartz fiber electrode 22 onto the reticle 30, light is directed upwardly through the interior of the dosimeter housing 16 via the bobbin 20, which is transparent, and a movable charging pin assembly 34, the center of which is also transparent, to be described hereinafter.

The charging pin assembly 34 includes an electrically conductive, elongated charging pin, or movable contact, 36 which is axially and fixedly mounted in a transparent electrically insulative glass cylinder 38. The glass cylinder 38 is mounted for axial movement relative to the housing 16 by an extensible brass bellows 40, which interconnects the cylinder 38 and the interior of the lower end of the dosimeter housing 16. The glass cylinder 38 electrically insulates the pin 36 from the bellows 40. The bellows 40 acts with sufficient force to normally position the glass cylinder 38, and hence the charging pin 36, at a point such that the upper end 36a of the charging pin is spaced slightly from a contact 18b electrically connected to the frame extension 18a, which contact 18b is securely mounted to the lower end of the bobbin 20.

To charge the capacitor 24 to a predetermined level, and thereby "zero" the quartz fiber electrode 22, it is necessary to move the charging pin 36 upwardly such that its upper end 36a is in electrical contact with the contact 18b secured to the bottom of the bobbin 20, which is in turn in electrical contact with one capacitor terminal via lead 24b and frame extension 18a, and while the charging pin is so positioned, apply a high voltage dc charging potential between the pin 36 and the dosimeter housing 16, which is electrically connected to the other terminal of the capacitor 24 via lead 24a. As the capacitor 24 becomes charged, the quartz fiber electrode 22 moves away from the frame 18 to an initialized, or "zero", position. When the capacitor 24 has been sufficiently charged, the pin 36 is allowed to return to its normal position spaced from the contact 18b under the retracting force of the bellows 40.

As set forth in the above-identified Jackson et al patent, the position to which the quartz fiber electrode 22 moves in the course of being initialized, or "zeroed", depends upon not only the charge on the capacitor 24, but also on the charge which exists between the charging pin 36 and the conductive bellows 40, which are electrically insulated from each other by the glass cylinder 38. To avoid erroneous measurements, it has been found desirable, after charging the capacitor 24 and disconnecting the electrical connection between the contact 18b and the pin charging end 36a, to intentionally and immediately discharge the capacitor established by the charging pin 36 and the bellows 40. When the capacitor 36/40 is discharged, the quartz fiber electrode 22 moves slightly toward the frame 18. It is the position of the quartz fiber electrode 22 immediately after intentionally discharging the capacitor formed by the charging pin 36 and bellows 40 which constitutes the "zero" position of the ensuing radiation measuring cycle.

The dosimeter charger of the present invention includes a housing 50, only portions of which are shown in the figure. The general housing construction may be the same as that illustrated in the aforementioned Jackson et al patent. The housing 50 is formed from a plastic material and carries an annodized aluminum charging socket 51 on an upper surface thereof. Carried for axial movement within the socket 51 is an insulative, light-conductive, post 52 carrying a first, central charging electrode 53 and an outer electrically conductive metal tube 54, serving as a second charging electrode. As shall be described in more detail hereinafter, the charging electrode 53, during a dosimeter charging operation, contacts the charging pin 36, while the metal tube 54 is electrically coupled to the tubular housing 16 of the dosimeter 10.

The charging socket 51, which receives the dosimeter 10 for charging, is secured to the top of the housing 50 by a nut 51a and lock washer 56, which are received on a threaded portion 57 of the socket which extends below the top of the housing 50. The upper portion of the tube 54 is received within, and electrically in contact with, a conical conductive metal ring 58, which is free to move axially within the socket 51. The conical ring 58 is biased upwardly by a relatively light spring 59, which bears against an interior shoulder 61 of the contact ring 58. When the lower end 16a of the dosimeter housing 16 enters the charging socket 51, and is moved downwardly therein, the housing 16 is maintained in good electrical contact about a conical upper edge 58a of the ring 58. The sliding conductive ring 58 in turn maintains electrical contact with the metal tubular electrode 54 as the ring 58 moves axially within the socket 51. The electrode 54 is also electrically connected to a metal bracket 62, which is connected to a charging circuit by a conductor 63, as shall be described hereinafter.

The charging post 52 and the tube 54 carried thereon are biased upwardly by a spring 64 of medium strength, exerting a somewhat greater force than that of the spring 59. The spring 64 bears against a steel washer 66 which in turn bears against a steel ring 67 carried in a groove 68 in the tube 54. Upward movement of the tube 54 and post 52 is limited by the engagement between a steel washer 69 (carried upon the steel ring 67), which in turn abuts a steel ring 71 that is retained within a groove 72 in the inside wall of the charging socket 51. The post 52 and its associated electrode 53 and tubular electrode 54 are therefore maintained in a fully upward position (limited by the ring 71) by the spring 64 prior to engagement by the top 53a of the charger electrode 53 with the charging pin 36 of the dosimeter.

The lower end of the light spring 59 carrying the ring 58 is supported on the washer 69 and ring 67, mounted on the tube 54. Since the spring 64 exerts greater force on the tube 54, via the ring 67, than does the spring 59, initial contact between the lower end 16a of the dosimeter and the conical surface 58a of the ring 58 results in downward movement of the ring 58 rather than downward movement of the charging post 52.

The lower end of the spring 64 supporting the tube 54 and the charging post 52 is received on the inside bottom surface of an anodized aluminum force adjusting sleeve 73. The force adjusting sleeve 73 is threadedly received on the threaded portion 57 of the charging socket 51. Rotation of the sleeve 73 establishes the degree of its engagement upon the socket 51, which in turn sets certain spring forces as shall be discussed hereinafter.

As the dosimeter 10 is urged into the charging socket 51, and the ring 58 is moved downwardly thereby, the charging pin 36 comes into contact with the top 53a of the charging electrode 53 mounted on the charging post 52. The charging electrode 53 is electrically connected through a conductor 74 to a source of positive potential in the dosimeter charging circuit, as shall be described. The conductor 74 extends within an insulating sleeve 76 through an aperture 77 in the tubular electrode 54 into its hollow interior to be received in the post 52. In the post 52 the conductor 74 is connected to the electrode 53.

As the dosimeter 10 is further moved into the socket 51, the pin 36 applies a force to the contact 53, pushing the post 52 downwardly against the force applied by the spring 64. The charging pin 36 remains relatively stationary within the dosimeter 10 at this time because the spring force of the bellows 40 in the dosimeter is greater than the spring force of the spring 64. The spring 59 urging the conical ring 58 upwardly against the bottom edge 16a of the dosimeter housing 16 ceases to have a significant effect, other than to continue to urge the ring 58 into good electrical contact with the dosimeter housing.

As the dosimeter is further urged downwardly into the socket 51, moving the ring 58 downwardly and compressing the spring 64, the washer 66 engages a heavy spring 78. Further downward movement of the dosimeter housing 16 into the socket 51 is opposed by the spring 78, which typically exerts a force via the post 52 and electrode 53 to the pin 36 greater than the force of the bellows 40. This results in the upward movement of the pin 36 so that the top of the pin 36a engages the contact 18b. Further downward movement of the dosimeter housing 16 into the socket 51, against the spring forces (primarily the force of the heavy spring 78) continues with the compression of the spring 78 until the bottom 58b of the conical ring 58 reaches a mechanical stop established by the top surface of the metal ring 71 secured in the interior wall of the socket 51.

In order to limit the amount of force exerted between the charger electrode 53 and the pin 36 and dosimeter electrode contact 18b, the spring force exerted on the contact 53 when the post 52 is fully depressed within the socket 51 is established at a preselected value. This is accomplished prior to charging by fully depressing the post 52 until the bottom surface 58b of the ring 58 abuts the ring 71 mounted in the wall of the socket 51. The force required to fully depress the post 52 is then measured using a force meter, while adjusting the position of the force adjusting sleeve 73. The sleeve 73 is rotated into greater or lesser proximity to the socket 51 to obtain the desired force by setting the spring tension of the spring 78 and the spring 64. In one form of the invention, this force is selected as eight pounds. Once the desired position for the sleeve 73 is obtained, set screws 79, threadedly received in the bottom of the sleeve 73, are tightened against the bottom of the socket 51 to hold the sleeve 73 in place at the desired position.

In order to facilitate viewing the position of the fiber 22 during the charging operation, the dosimeter is illuminated from the bottom of the tube 54, with light passing through the light-transparent post 52, glass cylinder 38, and transparent bobbin 20. The light is provided by a bulb 81 mounted in a socket 82 retained within a metal extension tube 83 attached to the bottom of the tube 54. The bulb socket 82 is retained within the tube 83 by a spring clip (not shown) having a leg passing through an aperture 84 through the tube 83 and the socket 82. The bulb 81 is electrically connected to the charging circuit by insulated leads 86, 87. The bulb socket 82 electrically insulates the bulb and its leads from the tube 83.

The bracket 62 is mounted upon, and in electrical contact with, the tube 83. The conductor 63 attached to the bracket 62 is electrically coupled via the bracket 62 and the tube 83 to the tube 54, which serves as the negative electrode of the charger.

As shall be described in more detail hereinafter, with regard to the charger circuitry, the bracket 62 carries a flag 88 mounted on a spring strip 89. As shall be described, the flag 88 serves as the operating element for an optical switch in the charger circuit.

With additional reference now to FIG. 2, a simplified electrical circuit for the charger apparatus is shown. The more detailed circuit shown in the aforementioned Jackson et al patent, or an equivalent, may be used, with, in the present instance, the utilization of an optical switch rather than the mechanical switch shown in the circuit in the patent.

The charger circuitry of FIG. 2 shall now be described in conjunction with an exemplary charging operation for a dosimeter 10. As the dosimeter 10 is introduced into the charging socket 51, the lower end 16a of the dosimeter housing 16 engages the conical surface 58a of the conductive ring 58. Moving the dosimeter into the socket results in downward movement of the conical ring 58, with the ring maintaining electrical contact between the electrode tube 54 and the dosimeter housing 16, against the force of the relatively light spring 59. As the dosimeter is further urged into the socket 51, the dosimeter contact pin 36 engages the central electrode 53 in the post 52. The pin 36 then urges the electrode 53, post 52 and tubular electrode 54 downwardly against the force of the spring 64.

The downward movement of the tubular electrode 54 results in concurrent downward movement of the bracket 62 and the flag 88 mounted thereon. As the flag 88 moves downwardly, a notch 91 in the flag moves into registry with the light path 92 of a photocoupler 93. The photocoupler 93 is fixedly mounted on a circuit board 94 which is in turn mounted on a portion 50a of the case 50. This downward movement of the flag 88 thereby closes the switch 93 (FIG. 2) formed by the photocoupler. As can be seen in FIG. 1, an adjustment screw 96 is provided on a bottom flange 97 of the bracket 62. The adjusting screw 96 is turned to set the position of the flag 88 and its opening 91 relative to the photocoupler 93 in order to set the point at which the switch 93 closes. This may be set for a certain amount of movement of the tube 54 and flag 88, or, preferably, for a certain amount of force urging the dosimeter into the charger socket required to close the switch. In one form of the invention, this force is set at 0.8 pounds.

When the switch 93 is closed, the negative terminal of a battery 98 is thereby coupled to ground. This completes a circuit including the battery 98 and a voltage multiplier 99, which results in the production of a high voltage dc charging potential on the line 100 at the output of the voltage multiplier 99. The voltage multiplier 99 basically comprises an inverter circuit, a transformer, and a voltage doubler and rectifier circuit. Such a circuit is described in more detail in the aforementioned Jackson et al patent.

Upon the closure of the switch 93, the charging circuit is thereby actuated to produce a positive high voltage dc charging potential on the electrode 53, relative to the second electrode, the tube 54, which is coupled to circuit common, or ground, via the conductor 63 and the switch 93. At this point, the spring 64 is partially compressed, and the washer 66, although moved downwardly, has not yet contacted the heavy spring 78. Also at this time, although the pin 36 is in contact with the electrode 53, the bellows 40 maintains the top of the pin 36a out of contact with the electrode contact 18b. Therefore, the pin 36 is charged relative to the dosimeter housing 16, but the electrode 18 is not yet charged.

As the dosimeter is further urged into the socket 51, and the spring 78 contacted and depressed, the pin 36 is moved upwardly and the top 36a of the pin contacts the electrode contact 18b. A charging potential is then applied to the electrode 18 relative to the dosimeter housing 16, charging the capacitor 24. Continued insertion of the dosimeter 10 into the socket 51 results in the engagement of the bottom 58b of the conical ring 58 with the top of the ring 71 which is mounted in the wall of the socket 51. At this point, the preset force, such as eight pounds, is exerted on the dosimeter electrode, and further movement of the dosimeter into the socket is prevented.

With the charging voltage applied across the capacitor 24, the electrode fiber 22 is placed at the desired "zero" position by adjusting a potentiometer 101. The potentiometer 101 is coupled in series with a resistor 102 between the output 100 of the voltage multiplier 99 and ground via the switch 93, which is now closed. Adjusting the potentiometer 101 adjusts the voltage on the capacitor 24, and hence the position of the electrode fiber 22. Once the fiber 22 is properly positioned, by establishing the necessary charge on the capacitor 24, the dosimeter 10 is withdrawn from the charger socket 51.

As the dosimeter 10 is withdrawn from the socket, the top of the pin 36a is maintained in contact with the electrode contact 18b since the force of the bellows 40 is overcome by the force of the spring 78. As the dosimeter is moved upwardly in the charger socket, and the tube 54 and electrode 53 urged upwardly in contact with the dosimeter by the springs 64 and 78, a point is reached at which the force of the bellows 40 (tending to separate the contacts 36a and 18b) is greater than that exerted by the springs. When this occurs, the top of the pin 36a is removed from contact with the electrode 18b, leaving the desired charge on the electrode 18.

With regard to the circuit of FIG. 2, at this time the switch 93 remains closed, and the charger is still operative. Further withdrawal of the dosimeter 10 from the socket 51, however, results in the movement of the washer 66 away from the spring 78 and the extension of the spring 64 in the charger. As this occurs, the tube 54 and flag 88 move upwardly, until the flag 88 blocks the photocoupler, opening the switch 93. When the switch 93 opens, the ground is removed from the negative terminal of the battery 98, and the high voltage supply is deactuated. At the same time, a transistor 103 coupled between the two charger electrodes 53, 54 is biased on through a base resistor 104 by the battery 98, rendering the transistor 103 conductive. The now-conductive transistor 103 discharges the potential between the two charger electrodes. Since, at this time, the pin 36 remains in contact with the electrode 53, and the dosimeter housing 16 remains in contact with the tubular electrode 54 via the conductive conical ring 58, the pin 36 is discharged. As described earlier, discharging the pin 36 eliminates a primary potential source of inaccuracy for radiation readings based upon the positioning of the fiber electrode 22.

As the dosimeter 10 is further removed from the socket 51, the post 52 and tube 54 reach their fully upward position, and the pin 36 moves away from contact with the electrode 53. Finally, as the dosimeter is removed from the socket 51, the housing 16 leaves contact with the ring 58, with the ring 58 also urged to its fully upward position by the spring 59.

In addition to charging the dosimeter 10, the charging circuit also effects illumination of the electrode fiber 22 for viewing the fiber through the dosimeter optics. As shown in FIG. 2, when the switch 93 is closed, a circuit is completed placing the battery 98 in series with the bulb 81 so that the electrode fiber 22 is illuminated during the charging operation. As described above, the light from the bulb 81 passes through the post 52, the cylinder 38, and the bobbin 20 to reach the optics at the top of the dosimeter. As also indicated earlier, a circuit such as the more detailed circuit illustrated in the above-identified Jackson et al patent may be employed, including the provision of such a feature as permitting the activation of the bulb 81 without charging the dosimeter.

While the invention has been described for use with a particular charging circuit, it will be understood that it may also be used with other charging arrangements such as one which employs an ac source rather than a battery to produce the high voltage dc charging potential.

What is claimed is:

1. Apparatus for charging a dosimeter having a capacitor connected between first and second relatively stationary dosimeter electrodes, an ionization chamber exposed to at least portions of said first and second electrodes to discharge said capacitor when ionizing radiation penetrates said chamber, a movable electrode electrically connected to said first electrode which deflects varying amounts depending upon the charge present on said capacitor, a first movable electrical contact shiftable between a non-charging position spaced from said first electrode and a charging position contacting said first electrode, and a first electrical insulator mounting said movable contact and maintaining said movable contact and said second electrode in spaced relation when said movable contact is in its charging and non-charging positions, said dosimeter charger apparatus comprising:

a first charging electrode and a second charging electrode;

a second, electrical insulator mounting said first and second charging electrodes in fixed spaced relation to each other susceptive of electrical coupling with said movable contact and said second dosimeter electrode, respectively, when it is desired to charge said dosimeter;

means for coupling a high voltage dc charging potential between said first and second charging electrodes in response to the actuation of a switch;

a switch coupled to the potential coupling means, which is responsive to the actuation thereof;

means for mounting said second electrical insulator for movement between a first position in which the switch is deactuated and a second position in which the switch is actuated to effect the coupling of a high voltage dc charging potential between said first and second charging electrodes; and means for yieldably resisting the movement of the second insulator past said second, switch actuating, position after said movable electrical contact in the dosimeter has shifted to its charging position contacting said first electrode, the first charging electrode being in contact with said movable contact of the dosimeter.

2. The charger apparatus of claim 1, for use with a dosimeter which includes means for urging the first movable electrical contact away from said first electrode with a first force, in which the means for yieldably resisting the movement of the second insulator in the charger includes a spring compressible to produce an increasing resistive force which, upon partial compression of the spring, exceeds the force of the means for urging the first movable electrical contact away from the first electrode in the dosimeter.

3. The charger apparatus of claim 2 in which the means for mounting the second electrical insulator further comprises a mechanical stop limiting the movement of the second insulator beyond its second, switch actuating, position before full compression of said spring.

4. The charger apparatus of claim 1 in which the means for yieldably resisting the movement of the second insulator includes means for adjusting a resistive force produced thereby.

5. The charger apparatus of claim 2 in which the means for yieldably resisting the movement of the second insulator includes means for adjusting said resistive force.

6. The charger apparatus of claim 5 in which the adjusting means comprises a charging socket receiving said second electrical insulator and an adjusting sleeve threadedly received on the socket and movable toward and away from the charging socket, said compressible spring exerting a force between the second electrical insulator and the adjusting sleeve.

7. The charger apparatus of claim 6 which further comprises a light source and means for mounting the light source relative to the second electrical insulator to illuminate the movable electrode of a dosimeter in said charger.

8. The charger apparatus of claim 7 in which the second charging electrode comprises an elongated metal tube and in which the means for mounting the light source comprises means for mounting the light source within said tube in light communication with said second electrical insulator.

9. The charger apparatus of claim 1 in which the switch comprises an optical sensor, and further comprising a flag member movable past said optical sensor to activate and deactivate the optical sensor and means for mounting said flag to said second electrode.

10. The charger apparatus of claim 9 in which the position of the flag relative to the second electrical insulator is adjustable.

11. The charger apparatus of claim 1 which further comprises a second movable electrical contact and means for mounting the second movable electrical contact for movement in electrical contact with said second charging electrode, such that the second movable electrical contact is susceptive of contact with the second dosimeter electrode when it is desired to charge said dosimeter.

* * * * *